(12) United States Patent
Youngwerth et al.

(10) Patent No.: US 9,157,489 B2
(45) Date of Patent: Oct. 13, 2015

(54) EXTERNAL ADJUSTER FOR CLUTCH INCORPORATING AN EXPANDING FRICTION DISK

(71) Applicants: Albert J. Youngwerth, Boise, ID (US); Sean G. Brown, Boise, ID (US); Daniel S. Youngwerth, Boise, ID (US)

(72) Inventors: Albert J. Youngwerth, Boise, ID (US); Sean G. Brown, Boise, ID (US); Daniel S. Youngwerth, Boise, ID (US)

( * ) Notice: Subject to any disclaimer, the term of this patent is extended or adjusted under 35 U.S.C. 154(b) by 52 days.

(21) Appl. No.: 13/889,263

(22) Filed: Sep. 5, 2013

(65) Prior Publication Data

US 2014/0102847 A1    Apr. 17, 2014

Related U.S. Application Data

(60) Provisional application No. 61/643,553, filed on May 7, 2012.

(51) Int. Cl.
  *F16D 13/75*  (2006.01)
  *F16D 13/52*  (2006.01)
  *F16D 25/12*  (2006.01)

(52) U.S. Cl.
  CPC ............. *F16D 13/75* (2013.01); *F16D 13/52* (2013.01); *F16D 13/752* (2013.01); *F16D 25/126* (2013.01); *F16D 2300/24* (2013.01)

(58) Field of Classification Search
  CPC ........ F16D 13/75; F16D 13/752; F16D 13/757
  USPC ............ 192/111.1, 111.11, 96, 105 B, 103 A, 192/85.17, 70.251, 83
  See application file for complete search history.

(56) References Cited

U.S. PATENT DOCUMENTS

| | | | | |
|---|---|---|---|---|
| 2,107,110 A * | 2/1938 | Eaton et al. | ................. | 192/85.14 |
| 3,841,454 A * | 10/1974 | Pionte | ....................... | 192/111.11 |
| 4,304,322 A * | 12/1981 | Beccaris | ................... | 192/111.12 |
| 4,732,251 A * | 3/1988 | Tipton | ........................ | 192/70.24 |
| 6,038,942 A * | 3/2000 | Gabas et al. | .............. | 192/111.11 |
| 7,083,035 B2 * | 8/2006 | Noguchi et al. | ......... | 192/111.11 |
| 7,104,373 B2 * | 9/2006 | Pick | ............................... | 192/83 |
| 2004/0238315 A1 * | 12/2004 | Drussel et al. | ............ | 192/105 B |
| 2008/0099302 A1 * | 5/2008 | Yasuda et al. | ............. | 192/111.11 |
| 2013/0334003 A1 * | 12/2013 | Youngwerth et al. | ...... | 192/85.17 |

* cited by examiner

*Primary Examiner* — Jacob S Scott

(57) ABSTRACT

An adjuster is disclosed, to be placed "in-line" to a clutch disengagement system. The adjuster provides a means for lifting the pressure plate above the clutch pack without significantly affecting the operation or feel of the clutch disengagement system to the operator. Such an adjuster is particularly well suited for use with an automatic centrifugal clutch incorporating a friction disk that expands when rotated above a threshold speed.

9 Claims, 13 Drawing Sheets

EXTERNAL ADJUSTER FOR CLUTCH INCORPORATING AN EXPANDING FRICTION DISK

CROSS-REFERENCE TO RELATED APPLICATIONS

This application is based upon provisional application 61/643,553 filed on May 7, 2012

BACKGROUND OF THE INVENTION

Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

Typically, such clutch systems include a clutch disengagement system consisting of a lever mechanically coupled to the pressure plate such that when the lever is actuated, the pressure plate's compressive force on the clutch pack is removed, disconnecting the rotational coupling between the clutch input and clutch output. Clutch disengagement systems typically couple the lever to the pressure plate mechanically through a hydraulic actuation system or a cable actuation system.

Most motorcycles incorporate a manual transmission coupled to the engine via a multi-plate clutch assembly. Typically, the multi-plate clutch is engaged/disengaged by the driver via a lever mounted on the handlebar. Although the lever operated clutch allows the driver to control the clutch engagement/disengagement, often times motorcycle drivers find the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

U.S. patent application Ser. No. 12/412,245 discloses an automatic clutch system incorporating an expanding friction disk and is incorporated herein by reference. One of the benefits of the improved automatic clutch system is the ability for the operator to override the automatic engagement of the clutch via a clutch lever without a significant change in how the clutch lever responds due to the centrifugal mechanism in the automatic clutch. Such a clutch system requires the pressure plate to be lifted away from the clutch pack to function properly. In application Ser. No. 12/412,245, lifting the pressure plate away from the clutch pack is accomplished with an adjuster within the engine cases.

However, for some motorcycle operators, the ability to adjust the position of the pressure plate without opening the engine cover to gain access to the clutch is important. Being able to adjust the position of the pressure plate externally allows the operator to make adjustments to the clutch system to compensate for clutch pack wear for example. By adjusting the position of the pressure plate so that it comes in contact with the clutch pack, allows the operator to quickly and easily configure the clutch so that when the engine is not spinning, the clutch is engaged. In this configuration, the clutch operation is similar to a manual clutch and allows the operator to "bump start" the engine. When the engine is off, with a gear selected and the clutch lever disengaged, rolling the motorcycle at sufficient speed and then suddenly releasing the clutch lever to engage the clutch, can start the engine.

Clutch disengagement systems utilizing a cable for the mechanical connection between the lever and the pressure plate are well known in the art and typically incorporate a cable end adjuster to accommodate for wear or expansion of the clutch pack. Such clutch disengagement systems are typified by the system provided on the 2009 Honda CRF450R motorcycle model and whose operation and adjustment are disclosed in the 2009 Honda CRF450R Owner's Manual.

The cable end adjuster allows the operator to increase or decrease the amount of lever "free-play". Lever "free-play" is defined as the movement of the lever between an outward stopping point of the lever against the lever mounting bracket or perch and inward movement until further movement of the lever will result in lifting of the pressure plate. Typically, the cable adjuster is positioned so that the lever has some "free-play" movement. By adjusting the cable end adjuster for more "free-play", the operator must move the lever further before the pressure plate begins to lift. With less "free-play", the operator will not need to move the lever as far before the pressure plate begins to lift. The cable end adjuster can typically be adjusted to remove all "free-play" movement and further adjustment of the cable end adjuster will result in the pressure plate being lifted above the clutch pack. In this state, there is no lever "free-play" but the cable end adjuster has been used to create the necessary gap between the pressure plate and the clutch pack for the expanding friction disk to function as described in application Ser. No. 12/412,245. The disadvantage to this type of configuration is that the clutch lever has no "free-play" and can be more difficult for the operator to pull in to disengage the clutch system.

For typical hydraulic clutch disengagement systems, no such provision exists for lifting the pressure plate through an in-line external adjuster.

Hydraulic clutch disengagement systems are well known in the art and are typified by systems made by Magura and Brembo and are included on motorcycles such as those provided by KTM such as the KTM model year 2010 KTM 250 XCW.

A typical hydraulic clutch disengagement system includes a master cylinder incorporating a reservoir for hydraulic fluid and a lever acting on a piston. A slave cylinder incorporates a bore and a piston; the piston typically acts upon the clutch throwout to lift the pressure plate for disengagement. A hydraulic line typically couples the master and slave cylinders and provides a conduit for the hydraulic fluid.

When the clutch lever is in the disengaged position, typically an open port exists between the slave cylinder piston and the reservoir of the master cylinder. When the clutch lever is in the engaged position, the open port between the reservoir and the slave cylinder is closed and no self-adjustment can take place. The slave cylinder typically incorporates a spring that pushes the piston in the slave cylinder towards the pressure plate. Because an open port exists to the master cylinder reservoir, the slave cylinder is free to move inward or outward towards the pressure plate; when the clutch lever is in the disengaged position.

Therefore a need exists for an adjustment mechanism, external to the engine cases, that can lift the clutch pressure plate to create a gap between the clutch pressure plate and clutch pack.

For a cable actuated clutch disengagement system, the adjustment mechanism should be provided to allow a gap between the clutch pressure plate and clutch pack while maintaining clutch lever free play and use of the clutch lever. For hydraulically actuated clutch disengagement systems, the adjustment mechanism should maintain the use of the clutch lever while providing the capability to lift the clutch pressure plate to create a gap between the clutch pressure plate and clutch pack.

It is therefore an object of the present invention to provide an adjuster mechanism, external to the engine cases, for a cable actuated clutch disengagement system that allows a gap between the pressure plate and clutch pack to be created while maintaining clutch lever "free-play".

It is another object of the invention to provide an adjuster mechanism, external to the engine cases, for a hydraulically actuated clutch disengagement system that allows a gap between the pressure plate and clutch pack to be created while maintaining the function of the hydraulically actuated clutch disengagement system.

A preferred embodiment of the present invention for cable actuated clutch disengagement systems is disclosed in FIGS. 5 through 8. A preferred embodiment of the present invention for hydraulically actuated clutch disengagement systems is disclosed in FIGS. 9 through 12. FIGS. 1A and 1B depict a typical clutch system positioned relative to the present invention. FIGS. 2 through 4 depict a clutch assembly similar to what is disclosed in U.S. patent application Ser. No. 12/412,245 with the clutch pressure plate positioned in three typical states.

DETAILED DESCRIPTION OF THE INVENTION

Figure 1A:
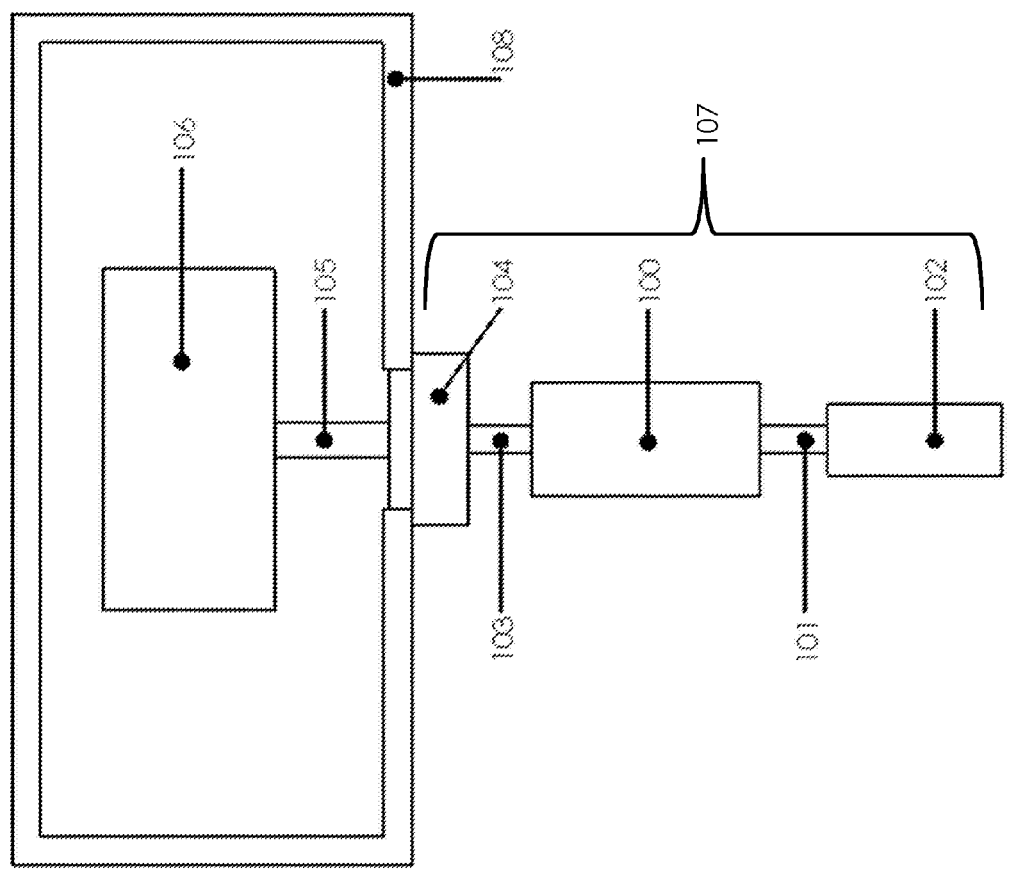
FIG. 1A depicts a typical clutch system employing a hydraulically actuated clutch disengagement system positioned relative to the present invention.

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides for a novel, external adjustment mechanism suitable for use in a clutch system that requires a gap to be formed between the pressure plate and clutch pack; such as disclosed in application Ser. No. 12/412, 245. A preferred embodiment is disclosed for both cable actuated clutch disengagement systems and hydraulically actuated clutch disengagement systems.

FIG. 1 discloses the novel adjuster 100 positioned in line relative to the clutch disengagement system 107. The clutch disengagement system 107 is coupled to the clutch 106 through the actuator 104 and throwout 105. The actuator 104 is connected to the engine case 108. The clutch override assembly 102 can be actuated for the purpose of engaging or disengaging the clutch 106. The novel adjuster 100 is positioned between the upper clutch conduit 101 and lower clutch conduit 103 and thus between the clutch override assembly 102 and actuator 104.

Clutch disengagement systems are well known in the existing art and can be configured for a cable-mechanical clutch disengagement system or a hydraulic-fluid clutch disengagement system. In a cable-mechanical clutch disengagement system the clutch override assembly 102 is usually comprised of a lever and perch allowing the clutch input assembly to be attached and anchored to the vehicle. In a hydraulic clutch disengagement system the clutch override assembly 102 is usually comprised of a master cylinder, lever and mounting means allowing attachment to the vehicle.

In the improved clutch disengagement system 107, the novel adjuster 100 is placed between the clutch override assembly 102 and actuator 104 interrupting the continuous conduit and creating the upper clutch conduit 101 and lower clutch conduit 103. In one embodiment the novel adjuster 100 is positioned closer to the clutch override assembly 102. In another embodiment the novel adjuster 100 positioned closer to the actuator 104. In yet another embodiment the novel adjuster is positioned equidistant from the clutch override assembly 102 and actuator 104

Figure 1B:
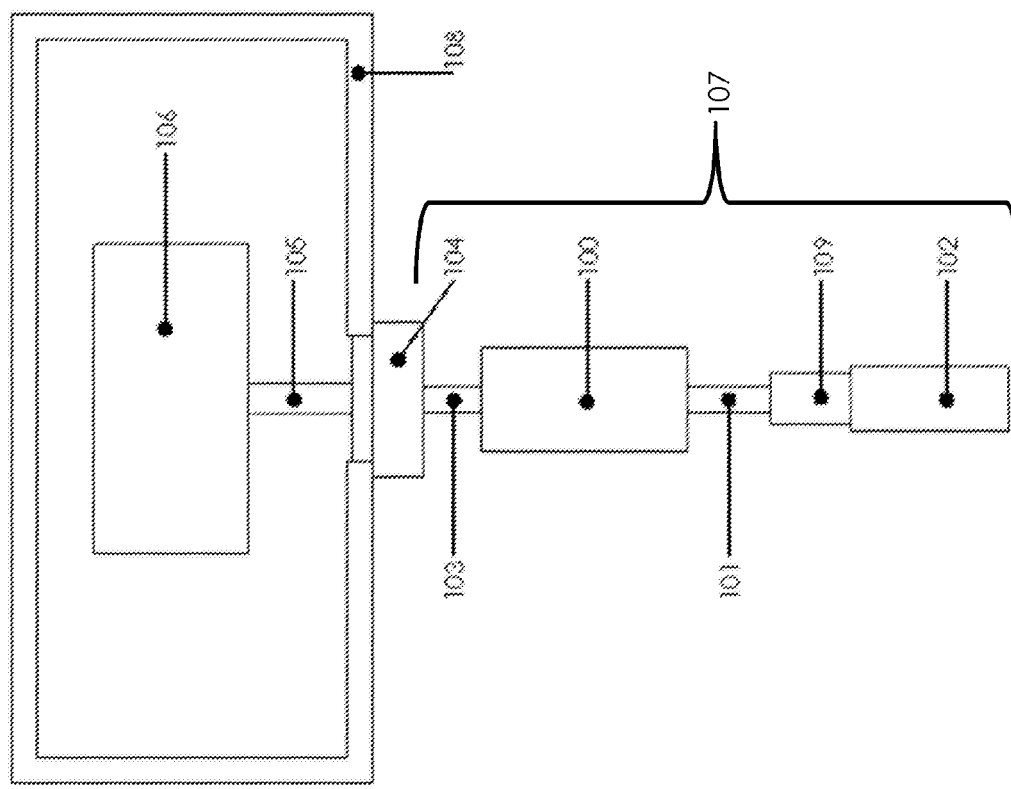
FIG. 1B depicts a typical clutch system employing a cable actuated clutch disengagement system positioned relative to the present invention.

FIG. 1B discloses an end adjuster 109 between the clutch override assembly 102 and upper clutch conduit 101. The end adjuster 109 allows the clutch disengagement system 107 to have additional adjustment to accommodate displacement of the upper clutch conduit 101 that can exist when the novel adjuster is used in a cable-mechanical clutch disengagement system allowing the operator to adjust the starting point of the lever.

The actuator 104 represents either a mechanical cam system in a cable-mechanical clutch disengagement system or a slave cylinder with slave piston in a hydraulic clutch disengagement system. In another embodiment the actuator 104 is comprised of a rack and pinion assembly.

In another embodiment the novel adjuster 100 can be configured with a hydraulic clutch disengagement system where the hydraulic clutch disengagement system is employed to act on a mechanical cam system rather than a slave cylinder.

Figure 2:
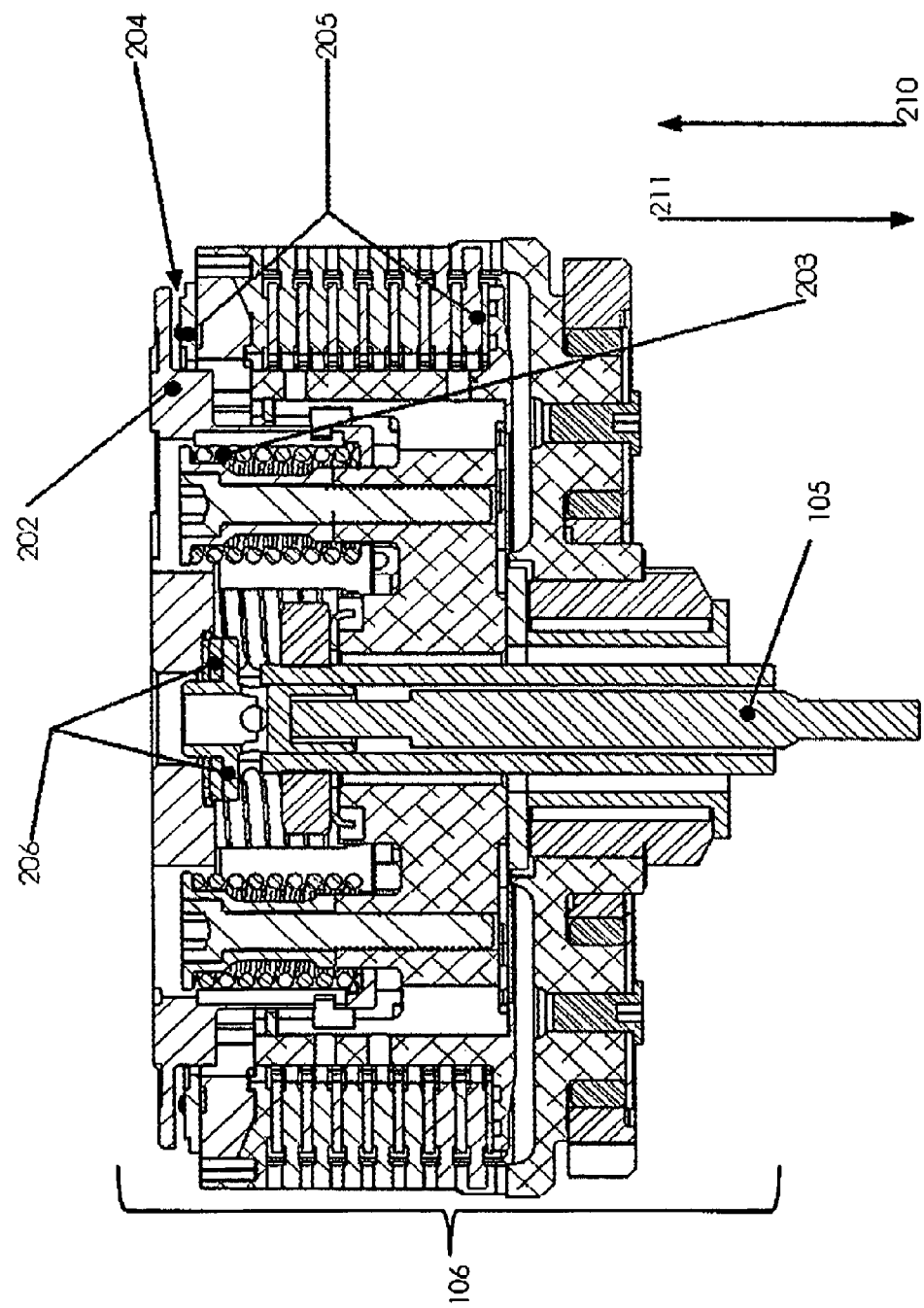
FIG. 2 depicts a clutch assembly similar to what is disclosed in U.S. patent application Ser. No. 12/412,245 with the pressure plate positioned to form a gap between the pressure plate and clutch pack.

FIG. 2 depicts the clutch 106 being similar to what is disclosed in U.S. patent application Ser. No. 12/412,245. The clutch 106 includes a pressure plate 202 with springs 203 which bias the pressure plate 202 in the inward direction 211. The clutch 106 includes a throwout top assembly 206 disposed between the pressure plate 202 and throwout 105. When the throwout 105 moves in the outward direction 210 the pressure plate 202 also moves in the outward direction 210.

FIG. 2 depicts the clutch 106 in a state where the pressure plate 202 has been positioned to create the installed gap 204 between the pressure plate 202 and clutch pack 205.

Figure 3:
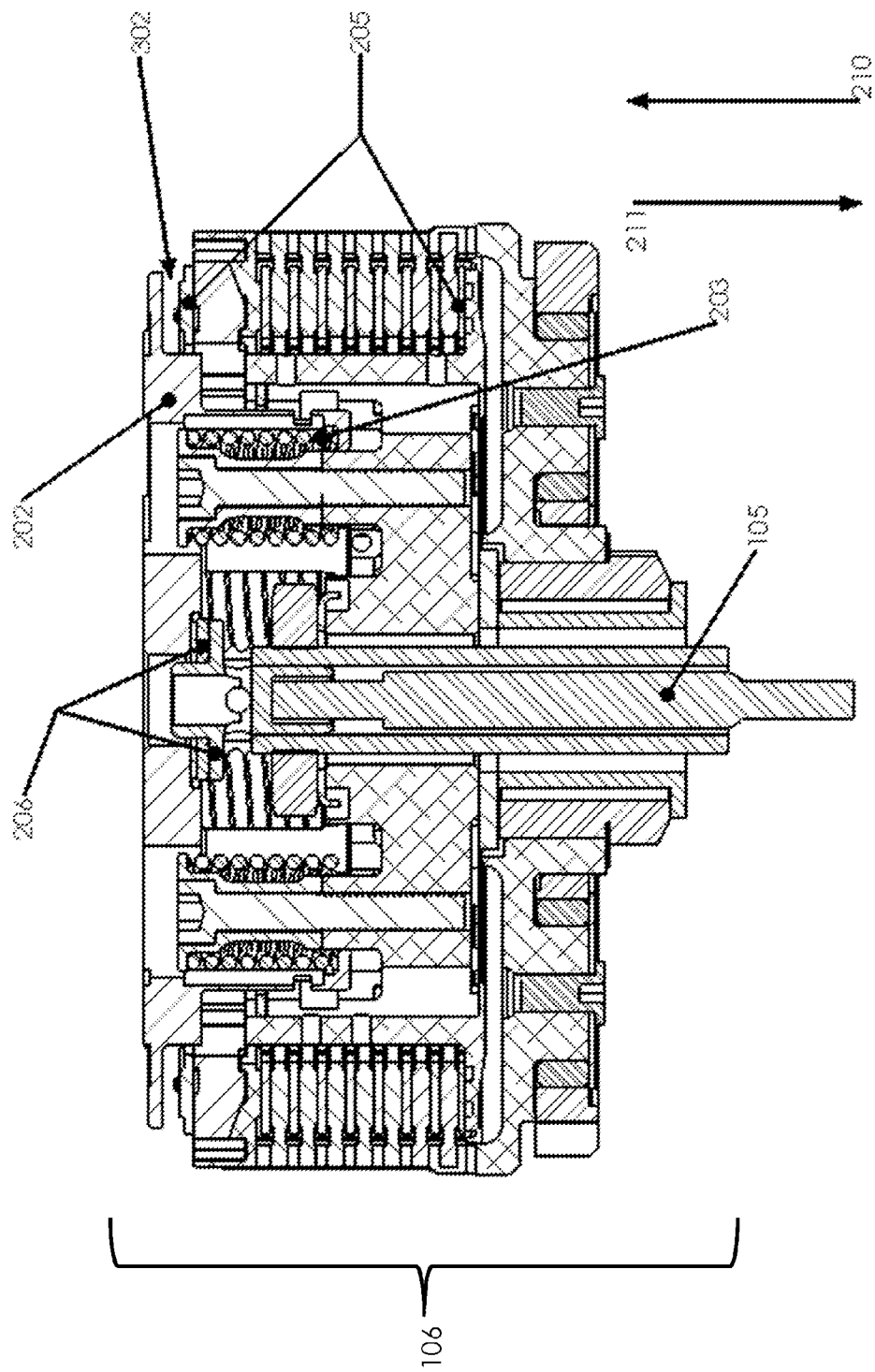
FIG. 3 depicts the clutch assembly in FIG. 2 with the clutch disengagement system activated to increase the distance between the pressure plate and clutch pack.

FIG. 3 depicts the clutch 106 from FIG. 2 in a state where the pressure plate 202 has been moved further in the outward direction 210. In FIG. 3 the operator has activated the clutch override assembly 102 disclosed in FIG. 1 further lifting the pressure plate 202 from the position in FIG. 2 consequently increasing the installed gap 204 to accommodate clutch disengagement. A disengaged gap 302 is formed between the pressure plate 202 and clutch pack 205. The disengaged gap includes the installed gap 204 from FIG. 2.

Figure 4:
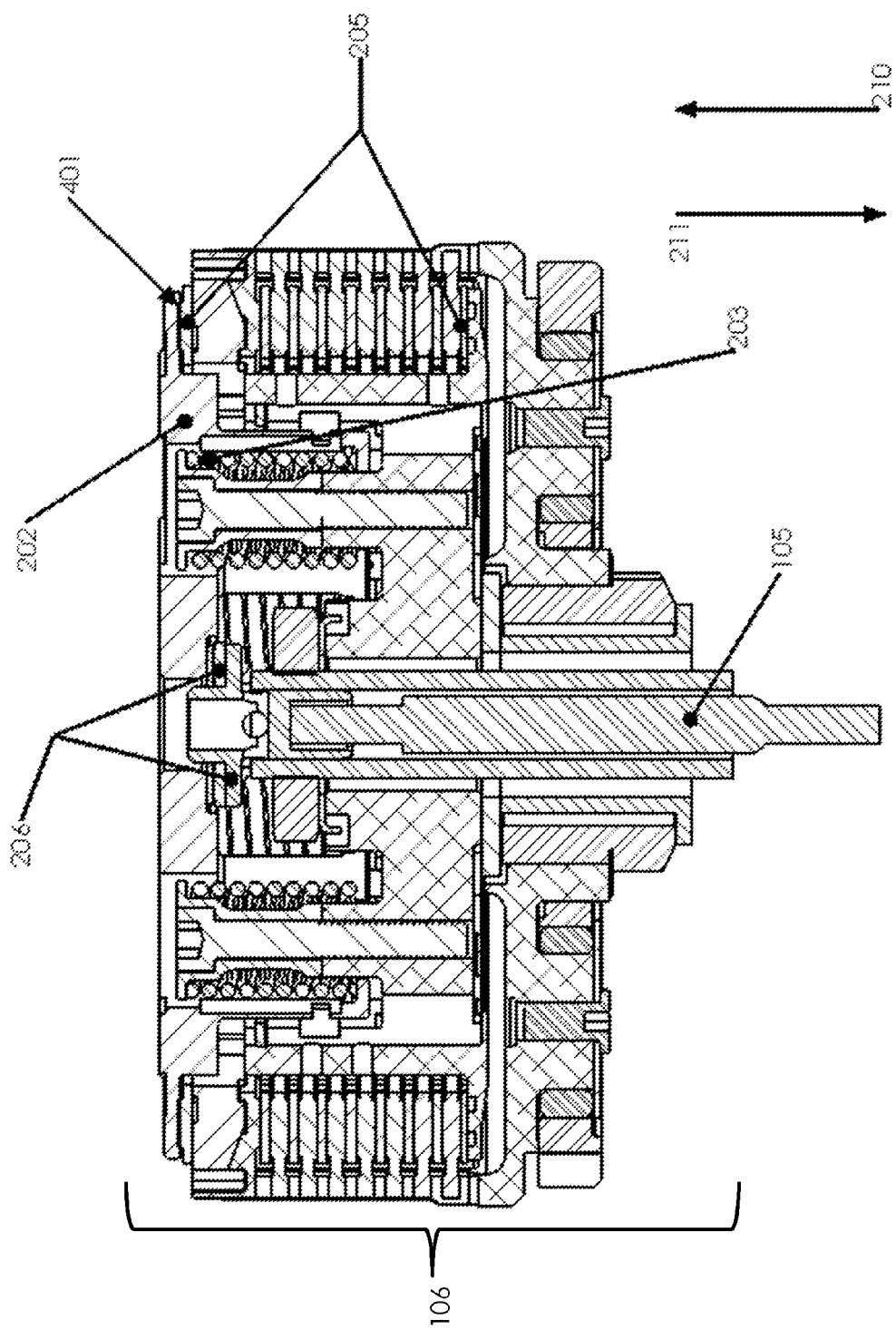
FIG. 4 depicts the clutch assembly in FIG. 2 with the pressure plate positioned in contact with the clutch pack and thus eliminating the gap created by the present invention.

FIG. 4 depicts the clutch 106 from FIG. 2 in a state where the pressure plate 204 is positioned in the inward direction 211 to eliminate the installed gap 204 creating no gap 401 and allowing the pressure plate 202 to contact the clutch pack 205 via the springs 203. With the pressure plate 202 touching the clutch pack 205 and transmitting force from the springs 203 to the clutch pack 205, the clutch 106 is in a state where it can be bump started.

Figure 5:
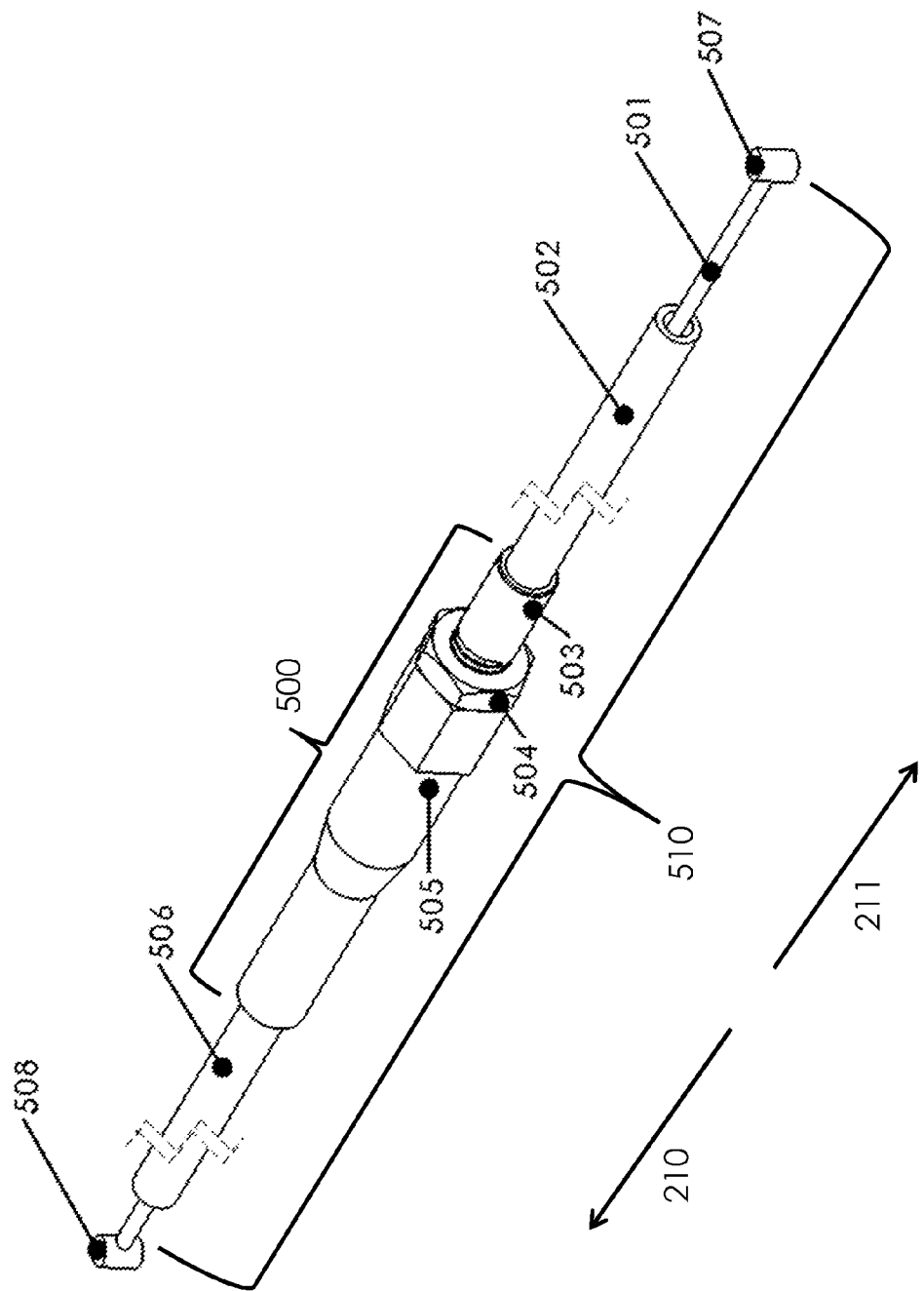
FIG. 5 is an isometric view depicting the present invention configured for use and disposed within a typical cable actuated clutch disengagement system.

FIGS. 5 through 8 disclose a novel cable adjuster 500 configured as part of a clutch cable assembly 510. In this embodiment, the novel cable adjuster 500 is designed to be "in-line" of a typical clutch cable assembly. The components of the novel cable adjuster 500 visible in FIG. 5 are the male adjuster 503, the female adjuster 505 and the locknut 504. In this embodiment, the male adjuster 503 threads into the female adjuster 505 to set the distance between the two components. The locknut 504 can be used to prevent relative rotational movement between the male adjuster 503 and the female adjuster 505. In another embodiment, grooves in a male adjuster and a circlip are used to set the distance between the two components.

In addition FIG. 5 discloses the inner cable 501, lower housing 502, upper housing 506, lower end 507 and upper end 508 as can be found in the prior art. The lower end 507 allows the inner cable to be connected to the actuator 104 and the upper end 508 allows the inner cable to be connected to the clutch override assembly 102 such that when the clutch override assembly 102 is activated the actuator 104 is able to position the pressure plate 202 via the throwout 105. The novel cable adjuster 500 is positioned between the lower housing 502 and upper housing 506 along the inner cable 501.

Figure 6:
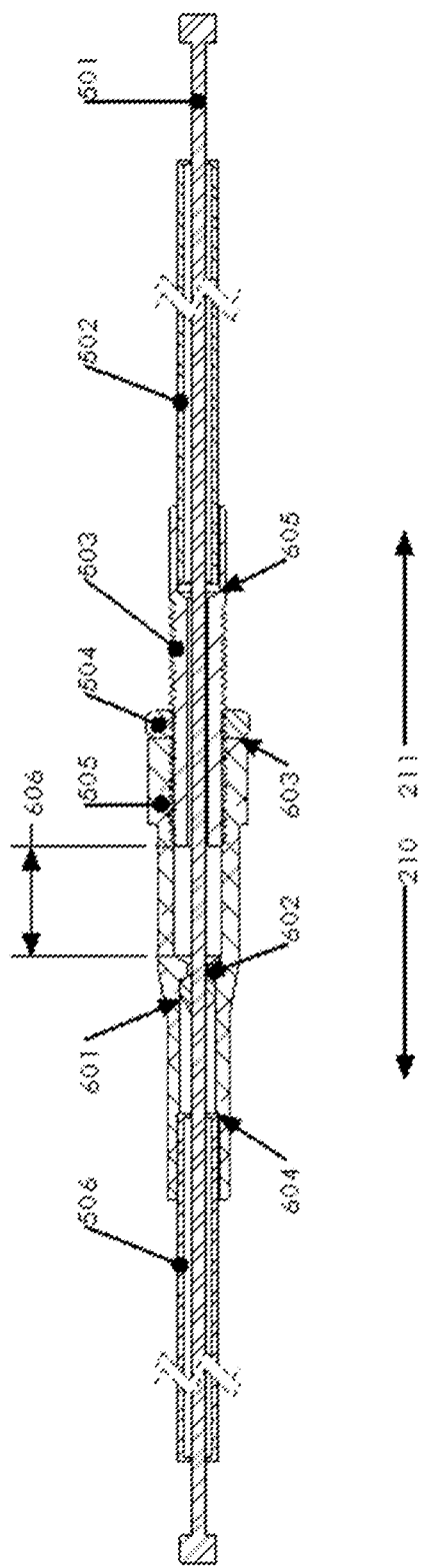
FIG. 6 is a section view detailing the present invention's internal components configured to a cable actuated clutch disengagement system, wherein the clutch disengagement system is not actuated and the novel adjuster mechanism is adjusted to lift the pressure plate to create an installed gap.

As depicted in FIG. 6, a ferrule 601 is firmly attached to the inner cable 501 in such a way that it will not move when a load is placed against it. The cable 501, lower housing 502, upper housing 506, lower cable end 507 and upper cable end 508 are all of typical construction as found on many modern motorcycle cable actuated clutch systems. The male adjuster 503 has external threads formed along its outer surface. The female adjuster 505 has female threads formed inside of female adjuster 505 corresponding to the threads of the male adjuster 503 so that the male adjuster 503 can be threaded into the female adjuster 505. When the female adjuster 505 is rotated while the male adjuster 503 remains stationary relative displacement between the female adjuster 505 and male adjuster 503 takes place.

FIG. 6 depicts the novel cable adjuster 500 adjusted in the outward direction 210 positioning the pressure plate 202 as depicted in FIG. 3 and thus forming the installed gap 204 also shown in FIG. 3. The female adjuster 505 contains a pressure face 602 which applies force to the ferrule 601 corresponding to the outward direction 210. As the female adjuster 505 is adjusted in the outward direction 210 it positions the ferrule 601 and in turn moves the inner cable 501 in the outward direction 210. The adjuster space 606 signifies the displacement that has taken place between the male adjuster 503 and female adjuster 505 to create the installed gap 204 shown in FIG. 2. The lock nut 504 is tightened against the face 603 of the female adjuster 505 to maintain the relative displacement between the female adjuster 505 and male adjuster 503. In this state, there is tension in the inner cable 501 between the ferrule 601 and the lower end 507 to position pressure plate 202. However, there is no tension in the cable between the ferrule 601 and upper end 508. In this state, the operator is able to adjust the clutch lever free play to their preference because the novel cable adjuster 500 has been used to create a gap between the pressure plate 202 and clutch pack 205.

Figure 7:
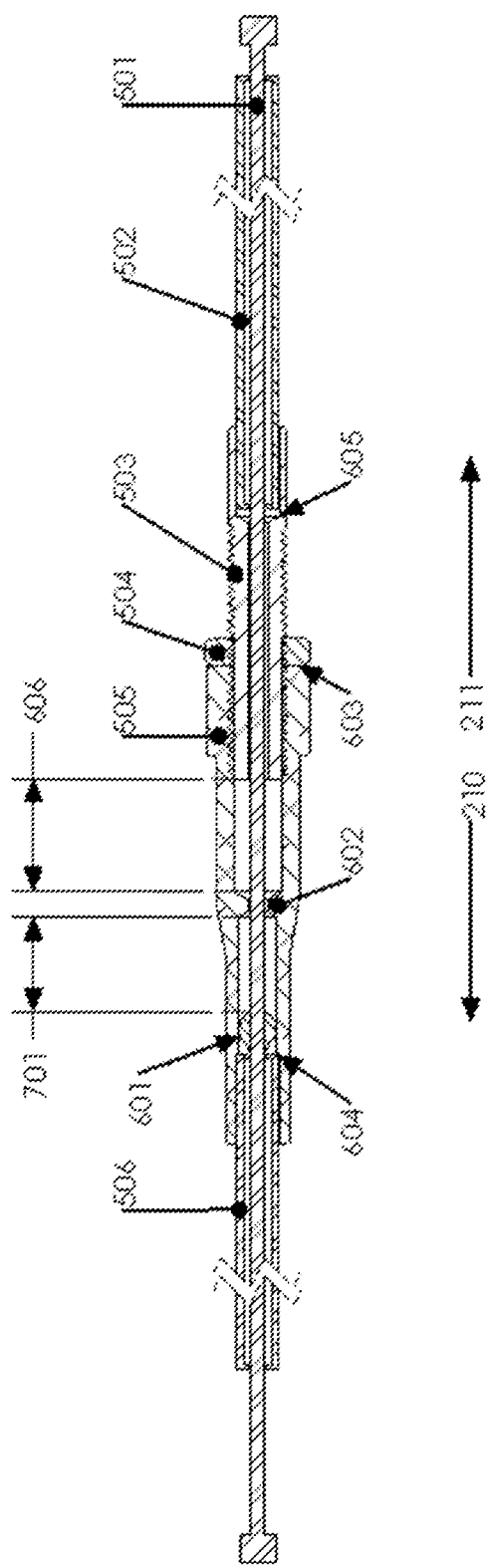
FIG. 7 is a section view detailing the present invention's internal components configured to a cable actuated clutch disengagement system, wherein the clutch disengagement system is actuated and the novel adjuster mechanism is adjusted to lift the pressure plate to create an installed gap.

FIG. 7 depicts the novel cable adjuster 500 and cable assembly 510 where the clutch override assembly 102 in FIG. 1B has been actuated advancing the inner cable 501 in the outward direction 210 creating the disengagement space 701 between the ferrule 601 and pressure face 602. The disengagement space 701 depicted in FIG. 7 corresponds to the disengaged gap 302 formed between the pressure plate 202 and clutch pack 205 shown in FIG. 3.

Figure 8:
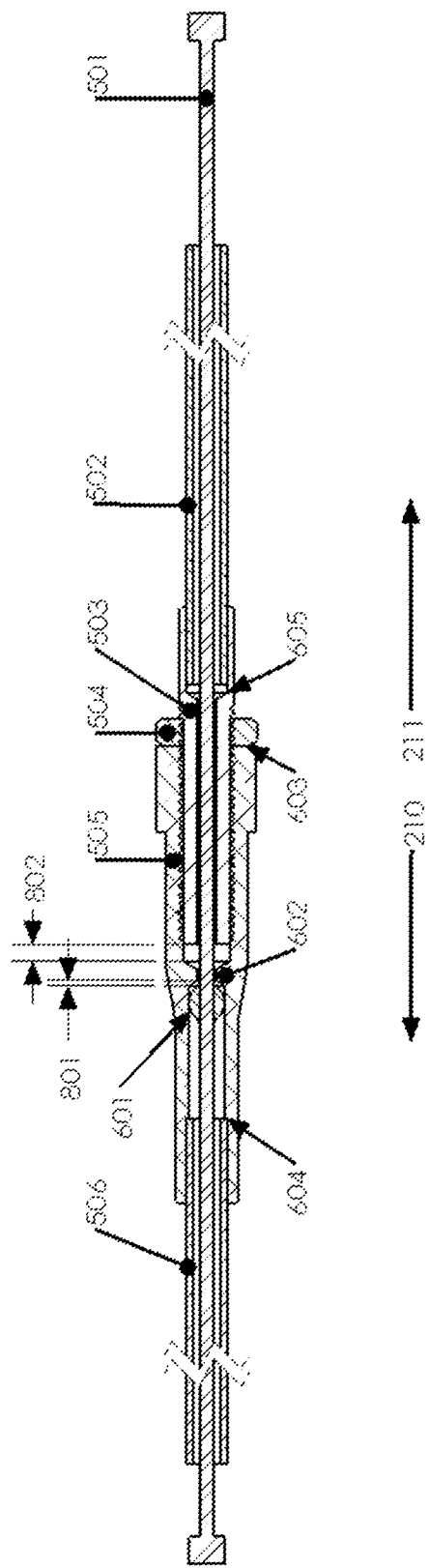
FIG. 8 is a section view detailing the present invention's internal components configured to a cable actuated clutch disengagement system, wherein the clutch disengagement system is not actuated and the novel adjuster mechanism is adjusted to allow the pressure plate to contact the clutch pack and eliminate the installed gap.

FIG. 8 depicts the novel cable adjuster 500 and cable assembly 510 configured for bump starting. The female adjuster 505 has been adjusted in the inward direction 211 relative to the male adjuster 503 thus eliminating the contact between the pressure face 602 and ferrule 601 resulting in the separation gap 801 between the ferrule 601 and pressure face 602. The separation gap 801 depicted in FIG. 8 corresponds to the pressure plate 202 position shown in FIG. 4 where the pressure plate 202 is contacting the clutch pack 205 for engagement creating no gap 401.

FIGS. 9 through 12 disclose a novel hydraulic adjuster 900 configured to be "in-line" in a typical hydraulically actuated clutch disengagement system between a clutch override assembly 102 and actuator 104 shown in FIG. 1A.

Figure 9:
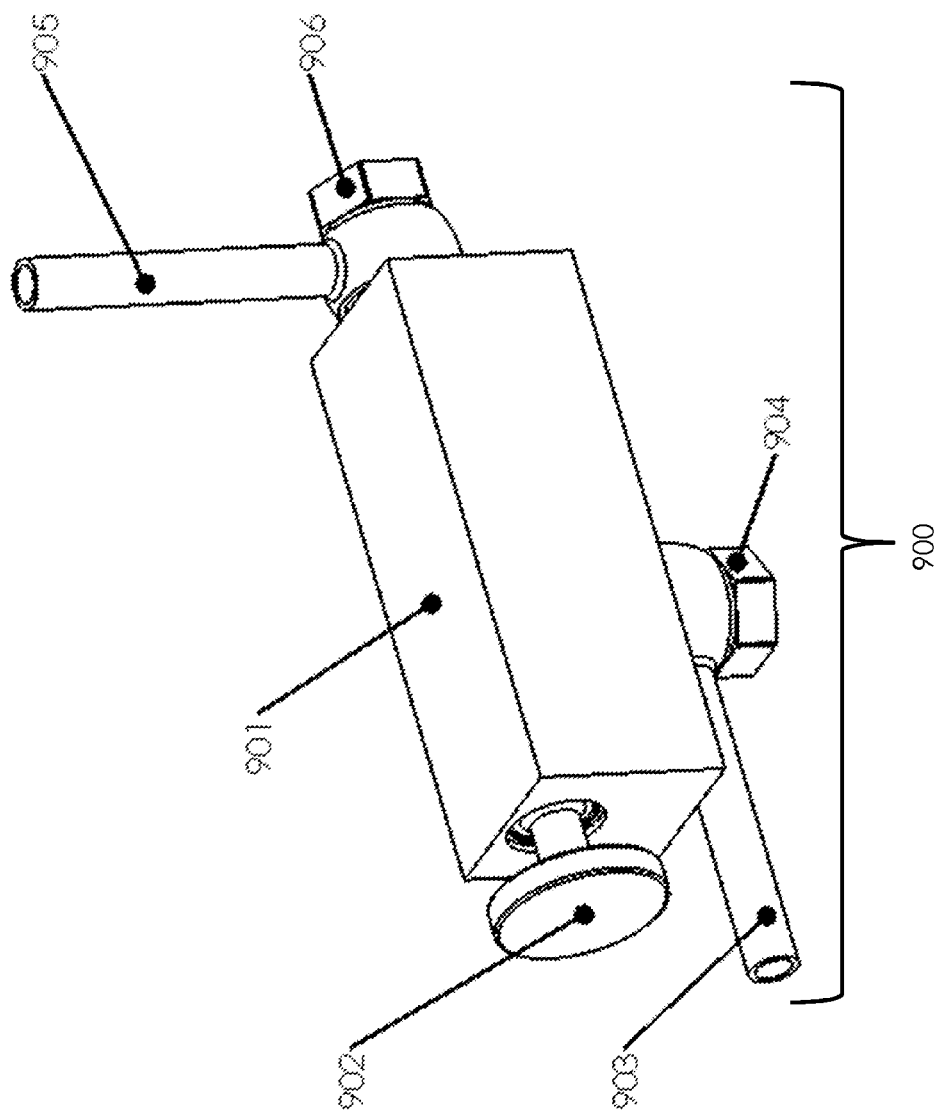
FIG. 9 is an isometric view of the present invention configured for use in a hydraulically actuated clutch disengagement system.

The components of the novel hydraulic adjuster 900 visible in FIG. 9 are the body 901, adjuster 902, upper hydraulic line 903, upper banjo bolt 904, lower hydraulic line 905 and lower banjo bolt 906 and are all of typical construction as found on many modern motorcycle hydraulically actuated clutch disengagement systems.

The upper hydraulic line 903 connects to the clutch override assembly 102. The lower hydraulic line 905 connects to the actuator 104 such that when the clutch override assembly 102 is activated the actuator 104 is able to position the pressure plate 202 via the throwout 105 by displacing hydraulic fluid within the system.

Figure 10:
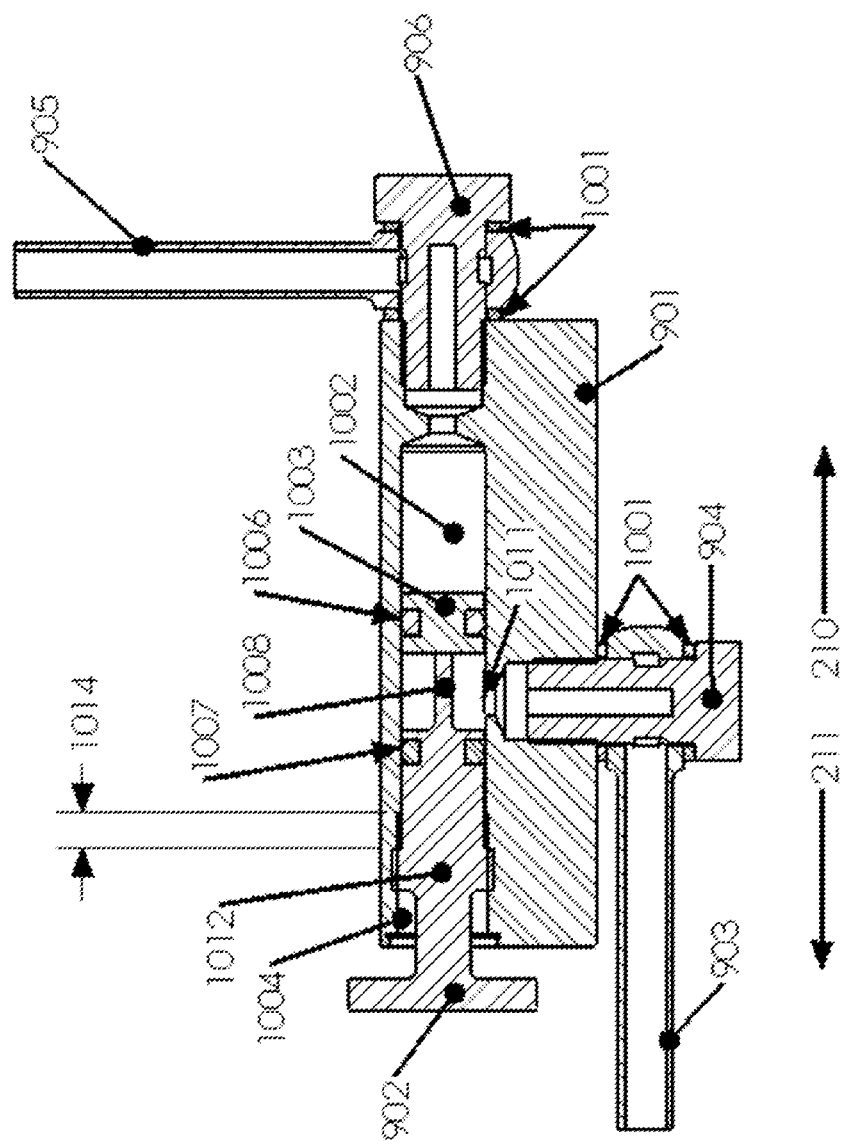
FIG. 10 is a section view of the present invention configured for use in a hydraulically actuated clutch disengagement system, wherein the clutch disengagement system is not actuated and the novel adjuster mechanism is adjusted to lift the pressure plate to create an installed gap.

FIG. 10 discloses sealing washers 1001 being used in conjunction with the upper banjo bolt 904 and lower banjo bolt 906 which provide a sealed connection between the upper hydraulic line 903, lower hydraulic line 905 and body 901 as can be found in the prior art.

FIG. 10 depicts the inner bore 1002 and threaded adjuster hole 1004 of the body 901. The inner bore 1002 contains the floating piston 1003 with floating piston seal 1006. The floating piston seal 1006 separates the fluid on either side of the piston seal 1006. The adjuster 902 has an externally threaded section 1012 allowing the adjuster 902 to thread into the body 902 via the threaded adjuster hole 1004. The adjuster 902 contains an adjuster seal 1007 for the purpose of sealing the portion of the inner bore 1002 between the adjuster 902 and floating piston 1003. Lastly, the adjuster 902 has a column 1008 extending the length of the adjuster 902 for the purpose of providing necessary separation between the floating piston 1003 and adjuster seal 1007 allowing the inlet port 1011 to open into the inner bore 1002 without the floating piston 1003 blocking the inlet port 1011.

The clutch override assembly 102 is operable to displace the actuator 104 via hydraulic fluid. The floating piston 1003 is therefore operable to displace hydraulic fluid within the inner bore 1002 in either direction. When the floating piston 1003 is acted on by clutch override assembly 102 the floating piston 1003 displaces the pressure plate 202. When the floating piston 1003 is positioned via the adjuster 902 in a direction corresponding to the outward direction 210 the pressure plate 202 is displaced in the outward direction 210.

FIG. 10 shows the adjuster 902 threaded into the threaded adjuster hole 1004 of the body 901. The column 1008 of the adjuster 902 is contacting the floating piston 1003 and has positioned the floating piston 1003 such that the position of the pressure plate 202 is positioned as shown in FIG. 2 creating the installed gap 204. Turning the adjuster 902 clockwise pushes the floating piston 1003 displacing the pressure plate 202 to create the installed gap 204.

Figure 11:
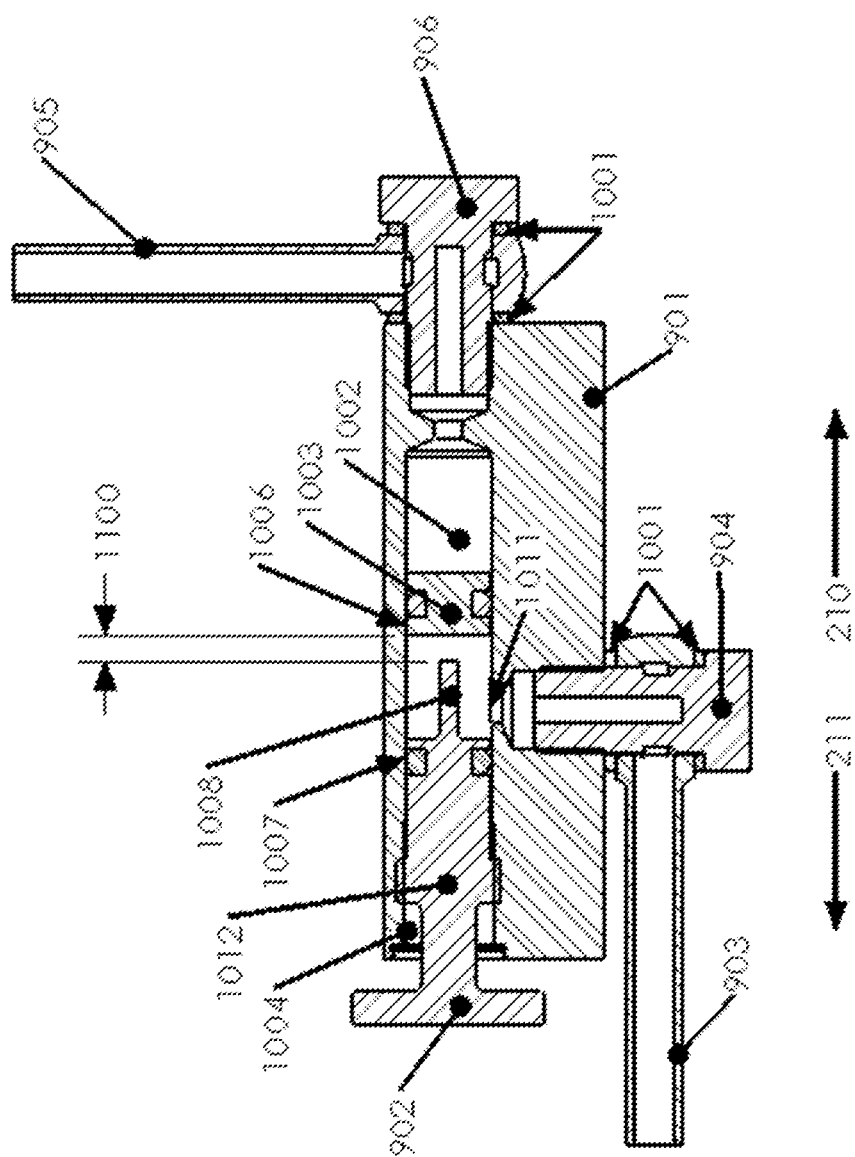
FIG. 11 is a section view of the present invention configured for use in a hydraulically actuated clutch disengagement system, wherein the clutch disengagement system is actuated and the novel adjuster mechanism is adjusted to lift the pressure plate to create an installed gap.

FIG. 11 depicts the system in a state where the clutch override assembly 102 is actuated with the novel hydraulic adjuster 900 adjusted as disclosed in FIG. 10. The position of the adjuster 902 is the same as shown in FIG. 10. However, in FIG. 11 the operator has actuated the clutch override assembly 102 causing the floating piston 1003 to be displaced further in a direction corresponding to the outward direction 210 signified by the piston gap 1100 between the column 1008 and floating piston 1003. The position of the floating piston 1003 in FIG. 11 corresponds to the position of the pressure plate 202 in FIG. 3 resulting in the disengaged gap 302 between the pressure plate 202 and clutch pack 205.

Figure 12:
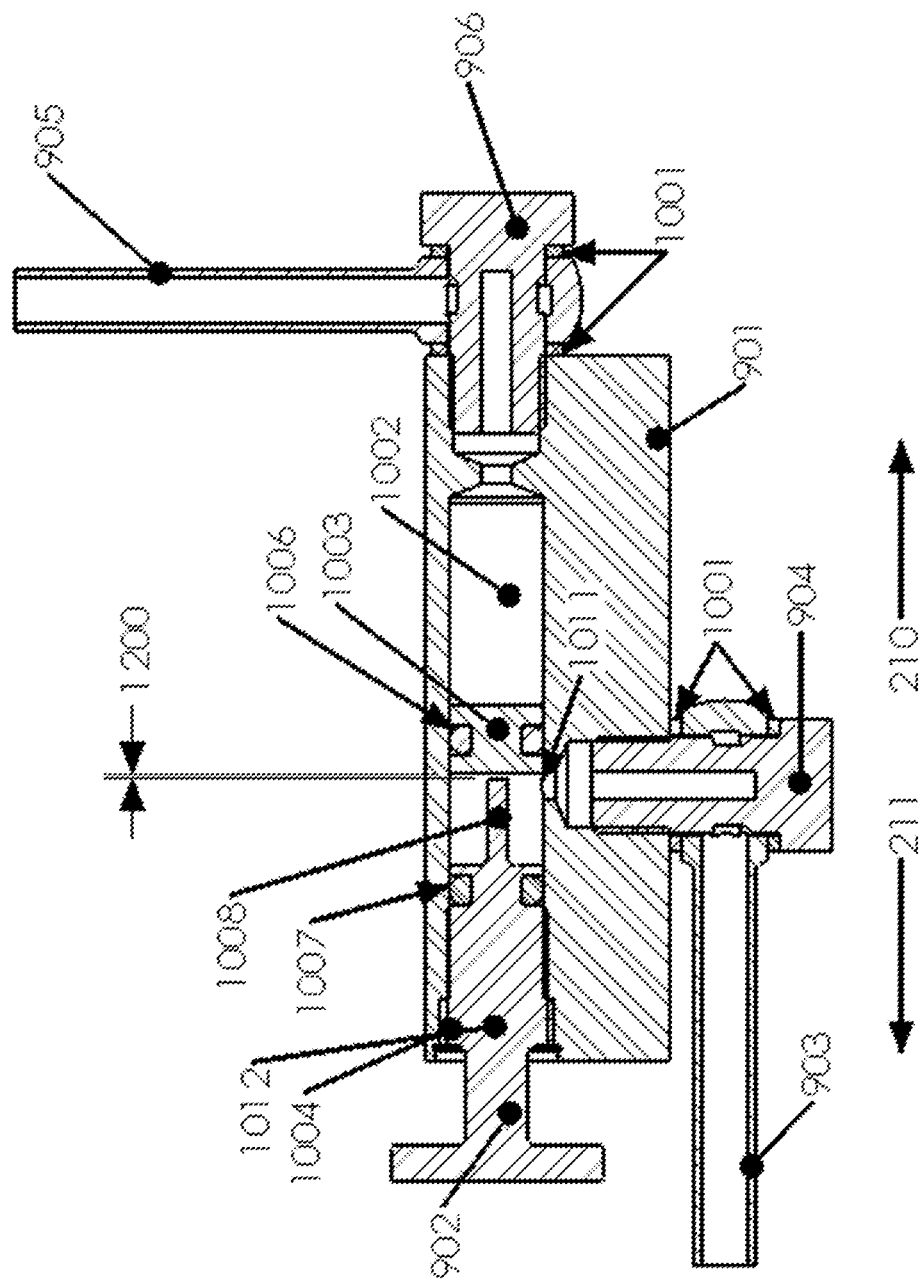
FIG. 12 is a section view of the present invention configured for use in a hydraulically actuated clutch disengagement system, wherein the clutch disengagement system is not actuated and the novel adjuster mechanism is not adjusted to lift the pressure plate to create an installed gap.

FIG. 12 depicts the novel hydraulic adjuster 900 in a state where the clutch override assembly 102 not actuated and the novel hydraulic adjuster 900 is not configured to position the pressure plate 202. Specifically, the adjuster 902 is not positioning the floating piston 1003 creating a column space 1200 between the adjuster 902 and floating piston 1003. In this state the position of the floating piston 1003 corresponds to the position of the pressure plate 202 depicted in FIG. 4 where pressure plate 202 is contacting the clutch pack 205 for engagement creating no gap 401.

The present invention may be embodied in other specific forms without departing from its spirit or essential characteristics. For example, for one skilled in the art, the present invention could be adapted for use in other types of vehicles that use clutch disengagement systems. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A clutch disengagement system including a clutch, a lever, and an actuator, an improvement comprising: a clutch cable assembly including an upper housing, a lower housing, an inner cable, said inner cable having an upper end and a lower end, a ferrule, an adjuster, said adjuster disposed between said upper housing and said lower housing, said inner cable passing through said upper housing, said lower housing and said adjuster, said ferrule attached to said inner cable and disposed within said adjuster, said upper end connected to said lever, said lower end connected to said actuator; wherein said adjuster is operable to displace said actuator independent of said lever.

2. The clutch disengagement system of claim 1 further comprising a pressure plate and a throwout, said throwout disposed between said pressure plate and said actuator and wherein said lever is operable to advance said actuator through said clutch cable assembly and wherein said actuator is operable to advance said pressure plate through said throwout.

3. The clutch disengagement system of claim 1 wherein said adjuster includes a first adjuster portion and a second adjuster portion, said ferrule disposed within said first adjuster portion and wherein said second adjuster portion is operable to displace said first adjuster portion, said first adjuster portion is operable to displace said ferrule and said ferrule is operable to displace said actuator.

4. The clutch disengagement system of claim 3 further comprising a pressure plate and a throwout, said throwout disposed between said pressure plate and said actuator and wherein said lever is operable to advance said actuator through said clutch cable assembly and wherein said actuator is operable to advance said pressure plate through said throwout.

5. A clutch disengagement system including a lever, a conduit, hydraulic fluid, and an actuator, wherein said hydraulic fluid mechanically connects said lever to said actuator through said conduit, an improvement comprising: an adjuster disposed between a first portion of said conduit and a second portion of said conduit, said adjuster comprising a floating piston and a floating piston adjuster wherein said floating piston adjuster is operable to displace said floating piston and said floating piston is operable to displace said actuator.

6. The clutch disengagement system of claim 5 wherein said adjuster is operable to advance said actuator independently of said lever.

7. The clutch disengagement system of claim 5 further comprising a pressure plate and a throwout, said throwout disposed between said pressure plate and said actuator and wherein said lever is operable to advance said actuator through said conduit and wherein said actuator is operable to advance said pressure plate through said throwout.

8. The clutch disengagement system of claim 6 further comprising a pressure plate and a throwout, said throwout disposed between said pressure plate and said actuator and wherein said lever is operable to advance said actuator through said conduit and wherein said actuator is operable to advance said pressure plate through said throwout.

9. A clutch disengagement system including a lever, an actuator and a pressure plate, and a multi-plate clutch wherein said actuator disengages said multi-plate clutch, a first mechanical connection disposed between said lever and said actuator, a second mechanical connection between said actuator and said pressure plate, wherein said lever is operable to advance said actuator through said first mechanical connection and wherein said actuator is operable to advance said pressure plate through said second mechanical connection, an improvement comprising: an adjuster, disposed between said lever and said pressure plate, wherein said adjuster includes a moveable coupling operable to advance said actuator independently of said lever.

* * * * *